United States Patent
Tripp et al.

(10) Patent No.: US 9,769,191 B2
(45) Date of Patent: Sep. 19, 2017

(54) MEASURING ROBUSTNESS OF WEB SERVICES TO DENIAL OF SERVICE ATTACKS

(71) Applicant: International Business Machines Corporation, Armonk, NY (US)

(72) Inventors: Omer Tripp, Bronx, NY (US); Emmanuel Wurth, Saubens (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 177 days.

(21) Appl. No.: 14/316,005

(22) Filed: Jun. 26, 2014

(65) Prior Publication Data
US 2015/0256553 A1    Sep. 10, 2015

(30) Foreign Application Priority Data
Jul. 3, 2013   (GB) .................................. 1311909.4

(51) Int. Cl.
*G06F 11/00* (2006.01)
*G06F 12/14* (2006.01)
(Continued)

(52) U.S. Cl.
CPC ...... *H04L 63/1433* (2013.01); *H04L 63/1458* (2013.01); *H04L 67/02* (2013.01); *H04L 67/42* (2013.01)

(58) Field of Classification Search
CPC . H04L 63/1433; H04L 63/1458; H04L 67/02; H04L 67/42
See application file for complete search history.

(56) References Cited

U.S. PATENT DOCUMENTS 6,157,940 A    12/2000  Marullo et al.
7,237,265 B2    6/2007  Reshef et al.
(Continued)

OTHER PUBLICATIONS

Intellectual Property Office, Search Report, Application No. GB1311909.4, Jan. 15, 2014, 3 pages.
Mainka, Christian, et al., "Penetration Testing Tool for Web Services Security", Services '12 Proceedings of the 2012 IEEE Eighth World Congress on Services, pp. 163-170.
(Continued)

*Primary Examiner* — Linglan Edwards
*Assistant Examiner* — Forrest Carey
(74) *Attorney, Agent, or Firm* — Cantor Colburn LLP; Maeve Carpenter

(57) ABSTRACT

A method for measuring robustness of web services includes selecting a web-service method for testing. The request pattern with the slowest response by the web-service method from a series of request patterns is selected as a request pattern for testing. The series of request patterns includes irregular requests, each having a payload aimed at destabilizing the web service. A test is applied to the web-service method, using the selected request pattern applied at an increasing frequency to the web-service method. The response time of the request pattern is monitored by the web-service method. The frequency of the applied request pattern when a threshold maximum time for response of the web-service method to the request pattern is reached, or when the method fails, is determined by a computer processor. A metric is determined for the web-service method based on the frequency of the applied request pattern required to reach the threshold.

12 Claims, 3 Drawing Sheets

(51) Int. Cl.

| | |
|---|---|
| *G06F 12/16* | (2006.01) |
| *G08B 23/00* | (2006.01) |
| *H04L 29/06* | (2006.01) |
| *H04L 29/08* | (2006.01) |

(56) References Cited

U.S. PATENT DOCUMENTS

| | | | |
|---|---|---|---|
| 7,849,448 B2 | 12/2010 | Yunus et al. | |
| 8,255,532 B2 | 8/2012 | Smith-Mickelson et al. | |
| 8,316,447 B2 | 11/2012 | Guruswamy | |
| 8,626,827 B1* | 1/2014 | Cabrera | H04L 41/5045 370/242 |
| 9,053,070 B1* | 6/2015 | Arguelles | G06F 15/177 |
| 2002/0010855 A1 | 1/2002 | Reshef et al. | |
| 2003/0065986 A1* | 4/2003 | Fraenkel | G06F 11/3006 714/47.2 |
| 2004/0210884 A1* | 10/2004 | Raghavachari | G06F 9/44505 717/158 |
| 2007/0282567 A1* | 12/2007 | Dawson | G06F 11/3414 702/186 |
| 2010/0138925 A1 | 6/2010 | Barai et al. | |
| 2010/0235917 A1 | 9/2010 | Ku et al. | |
| 2012/0233656 A1 | 9/2012 | Rieschick et al. | |
| 2013/0227698 A1 | 8/2013 | Taniguchi et al. | |

OTHER PUBLICATIONS

Sachdeva, Monika, et al., "Performance Analysis of Web Service unde DDoS Attacks", 2009 IEEE International Advance Computing Conference, Patiala, India, Mar. 6-7, 2009, pp. 1002-1007.

\* cited by examiner

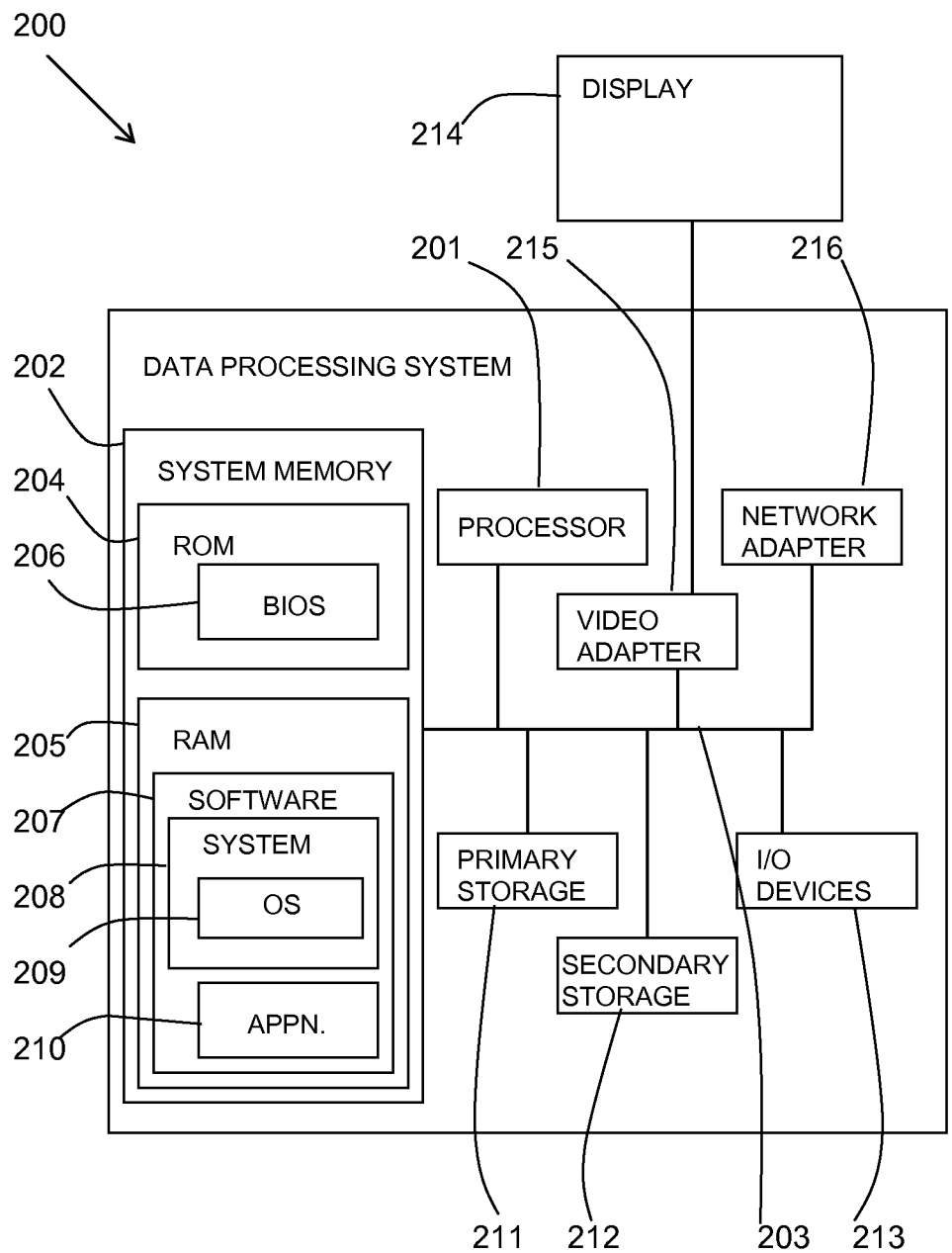

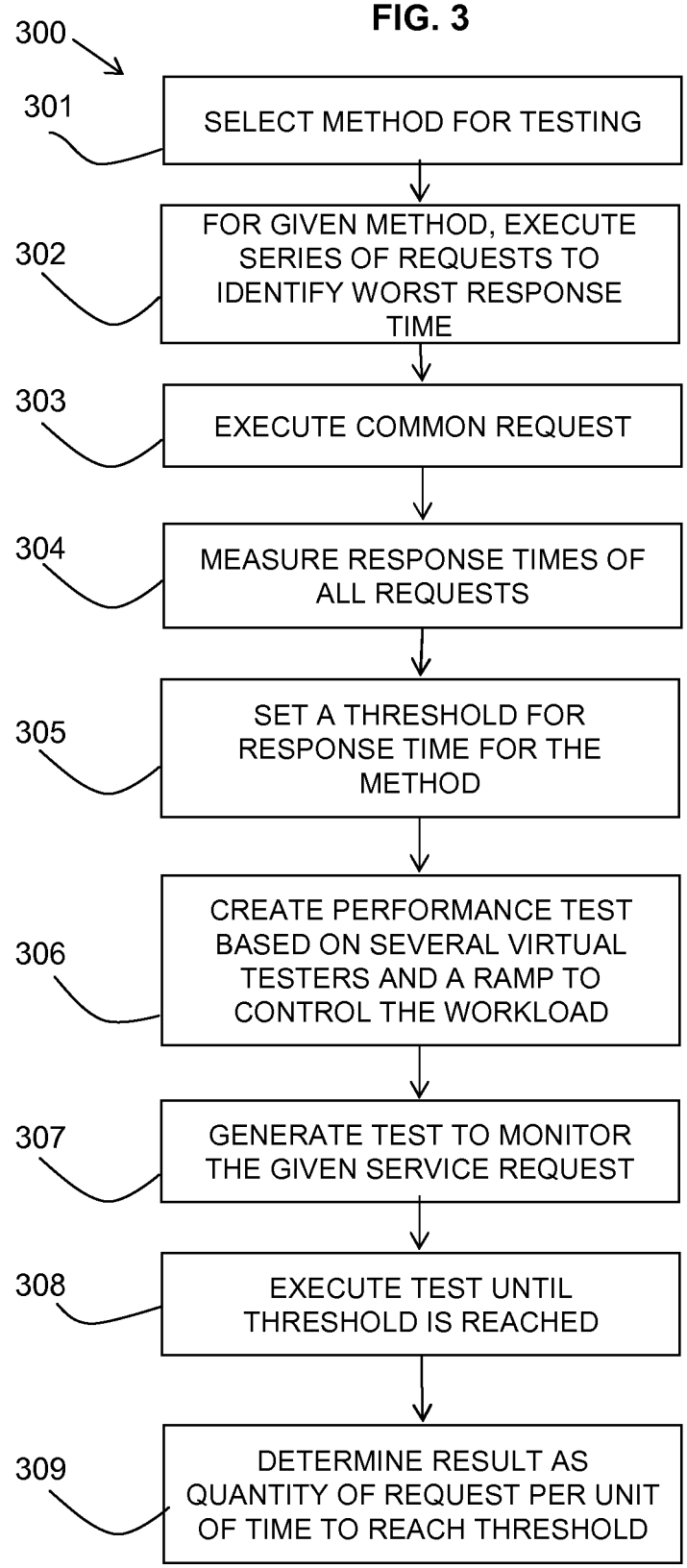

MEASURING ROBUSTNESS OF WEB SERVICES TO DENIAL OF SERVICE ATTACKS

PRIORITY

This application claims priority to Great Britain Patent Application No. 1311909.4, filed 3 Jul. 2013, and all the benefits accruing therefrom under 35 U.S.C. §119, the contents of which in its entirety are herein incorporated by reference.

BACKGROUND

The present invention relates generally to measuring the robustness of web services and, more particularly, to measuring the robustness of web services to denial of service attacks.

Web services provide services and functionality to remote clients. Web services are becoming increasingly more central in the design and implementation of web applications, where online access to data, functionality (for example, responding to search requests by invoking the Google™ web service), and verification of user-provided information (for example, by consulting the American government's web service for the credentials of an ID owner) are critical.

Web services are usually verified in terms of agreements based on given workloads and serviceability criteria. For example, it may be required that a web service ensure that 1000 clients may connect at the same time, or it may be required that the web service answer under a given workload with a maximum response time.

Web services are also verified in terms of robustness to security attacks.

In computing, a denial of service attack (DoS attack) or distributed denial of service attack (DDoS attack) is an attempt to make a machine or network resource unavailable to its intended users. Do S attacks attempt to interrupt or suspend web services of a host connected to the Internet either temporarily or indefinitely.

One common method of attack involves saturating the target machine with external communications requests. The target computer may receive so many requests that it is unable to respond to legitimate traffic, or responds so slowly as to be rendered essentially unavailable. Such attacks usually lead to a server overload. DoS attacks may either force the target computer to reset, or may consume its resources so that it can no longer provide its intended service. DoS attacks may also obstruct the communication media between the intended users and the target computer, so that they can no longer communicate adequately.

An XML (Extensible Markup Language) denial-of-service (XDoS) attack is a content-borne attack whose purpose is to shut down a web service or system running that service. A common XDoS attack occurs when an XML message is sent with a multitude of digital signatures, and a naive parser attempts to look at each signature and uses all the CPU cycles, eating up all resources. These are less common than inadvertent XDoS attacks, which occur when a programming error by a trusted customer causes a handshake to go into an infinite loop.

In a pragmatic way, the most obvious denial of service metric is the quantity of common request per unit of time that can be handled by a web service until significant changes appear into the response time for a given operation or until a total failure on the server side appears. This corresponds to common performance tests that are executed to compute the required hardware infrastructure for a given service.

However, there is no current method of measuring the robustness of a given web service against denial of service attacks based on the worst condition that the web service may need to face in terms of processor consumption on the server side.

SUMMARY

In one embodiment, a method for measuring the robustness of web services includes selecting a web-service method of a web service for testing. The request pattern with the slowest response by the web-service method from a series of request patterns is selected as a request pattern for a test. The series of request patterns includes irregular requests, each having a payload aimed at destabilizing the web service. A test is applied to the web-service method, where the test uses the selected request pattern applied at an increasing frequency to the web-service method. The response time of the request pattern is monitored by the web-service method. The frequency of the applied request pattern when a threshold maximum time for response of the web-service method to the request pattern is reached, or when the method fails, is determined by a computer processor. A metric is determined for the web-service method based on the frequency of the applied request pattern required to reach the threshold.

In another embodiment, a system for measuring the robustness of web services includes a web-service method selection component, a request execution component, a performance test applying component, a test monitoring component, and a metric determining component. The web-service method selection component is configured to select a web-service method of a web service for testing. The request execution component is configured to select, as a request pattern for a test, the request pattern with the slowest response by the web-service method from a series of request patterns including irregular requests having a payload aimed at destabilizing the web service. The performance test applying component is configured to apply a test to the web-service method, where the test uses the selected request pattern applied at an increasing frequency to the web-service method. The test monitoring component is configured to monitor the response time of the request pattern by the web-service method. The metric determining component is configured to determine, by a computer processor, the frequency of the applied request pattern when a threshold maximum time for response of the web-service method to the request pattern is reached or when the web-service method fails and to a metric for the web-service method based on the frequency of the applied request pattern required to reach the threshold.

In yet another embodiment, a computer program product for measuring the robustness of web services includes a computer readable storage medium having program instructions embodied therewith. The program instructions are executable by a processor to cause the processor to perform a method. The method includes selecting a web-service method of a web service for testing. The request pattern with the slowest response by the web-service method from a series of request patterns is selected as a request pattern for a test. The series of request patterns includes irregular requests, each having a payload aimed at destabilizing the web service. A test is applied to the web-service method, where the test uses the selected request pattern applied at an increasing frequency to the web-service method. The response time of the request pattern is monitored by the web-service method. The frequency of the applied request pattern when a threshold maximum time for response of the web-service method to the request pattern is reached, or when the method fails, is determined. A metric is determined for the web-service method based on the frequency of the applied request pattern required to reach the threshold.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which:

FIG. 2 is a block diagram of a computer system in which the present invention may be implemented, in accordance with some embodiments; and FIG. 3 is a flow diagram of a measuring method in accordance with some embodiments.

DETAILED DESCRIPTION

Figure 1:
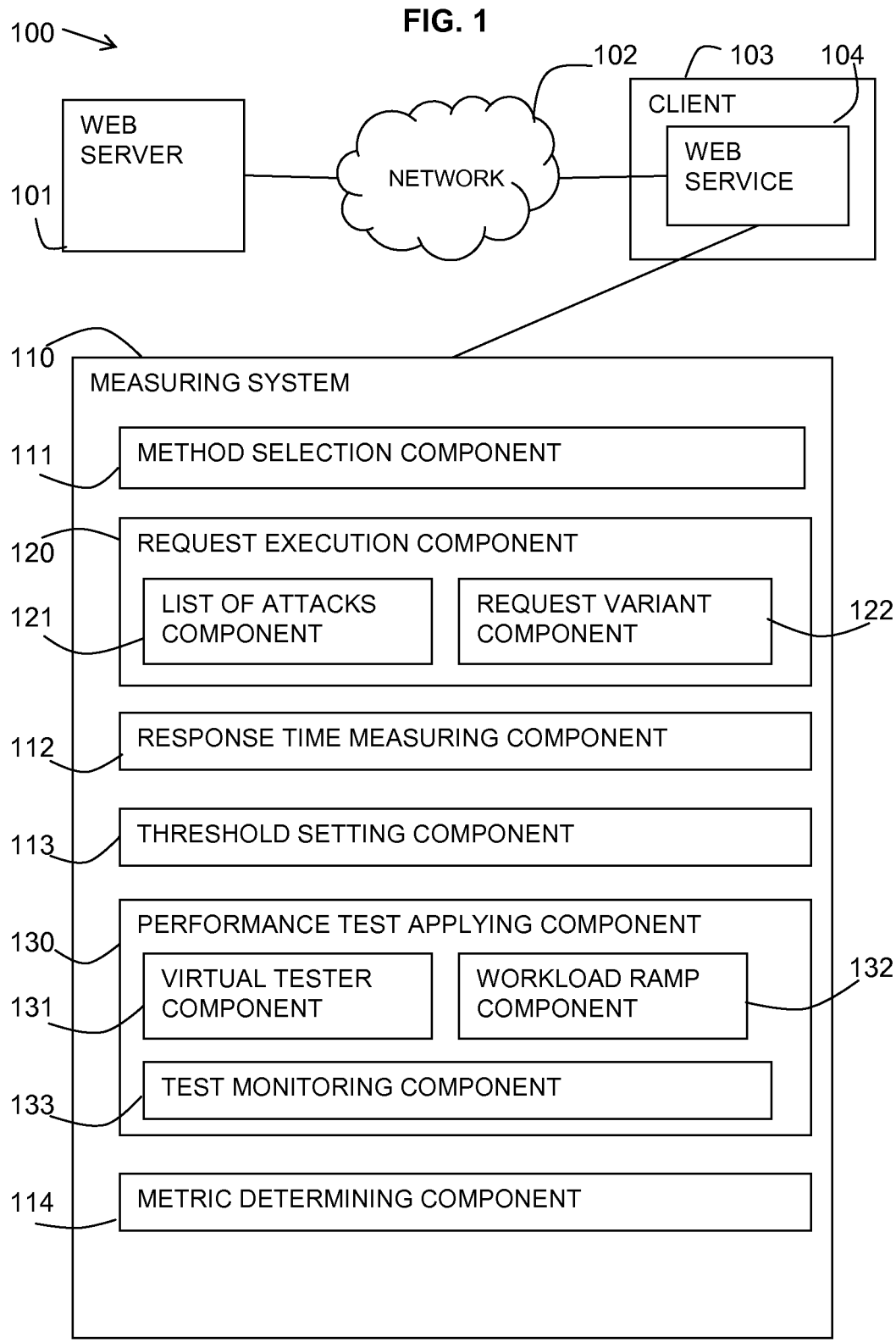
FIG. 1 is block diagram of a measuring system in accordance with some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A measuring method and system are provided for the measurement of the robustness of a given web application or web service against denial of service attacks. The described measuring method may be considered a hybrid approach, which is a mixture of a qualitative approach (i.e., using specific web services attacks) and quantitative approach to measure the robustness of a web service to malicious denial of service attacks.

A way to measure the robustness of the web service is proposed that does not focus directly on the web service application side (i.e., the fact the attacks are successful) but rather focuses on the worst condition that the web application may have to face in terms of CPU (central processing unit) consumption on the server side. The CPU consumption on the server side may be induced, for example, by attacks; mutations on the parameters side; or exploration of the transport layer, which, even if the intent is not a global failure of the service, can destabilized the service in a dramatic way.

The described method and service combine a monitoring of response time of a given method of a web service with a mixture of call tests executed using several injection platforms (i.e., execution threads), until a threshold of a maximum acceptable response time for the given method or the total failure of the web service is reached.

A series of requests may be used, including irregular requests, which may have a payload aimed at destabilizing a web server providing the web service, as well as common requests having regular parameters. The irregular requests may include various different forms of payloads that are designed to attack the server. This may include predefined and extensible aggressive attacks or mutations/irregularities to parameters and methods of transport of the request.

A performance test load framework may then be used to compute the minimum quantity of workload required to destabilize a given web service according to a serviceability threshold using the slowest responding request.

The resulting robustness metric may be expressed in terms of requests per unit of time required to observe the failure or to observe that the response time threshold is reached. In other words, the metric may provide a notion of difficulty of destabilizing the web service. This measure may also be explained as the minimum quantity of requests that destabilize the infrastructure required in order to observe response time failures, which by design will be less than or equal to the quantity of simultaneous connections that need to be done on the web service side to observe the same behavior.

A web service may be considered to be "robust" if it answers quickly to input that might destabilize it on the response time side. A robustness metric may be computed using a common request use case, meaning a common call of the web service with common inputs as expected by the web service designers.

However, when a web service has not been updated, such as when irregular requests with unexpected inputs are provided, it may lead to exception paths into the web service code or into the infrastructure, which are more time consuming. In this case, the result of the robustness metric may be less than the common request.

For example, if 2000 calls per second are required using common requests to cause the server to show significant alteration of response time or to crash, then with irregular requests, the resultant response time may be significantly less than 2000 calls per second to observe such a degradation in performance.

The irregular requests themselves may already be known attacks or mutations; however, the described measuring method uses these irregular requests with a performance testing framework so that an indication of the robustness to DoS can be computed.

Referring to FIG. 1, a block diagram shows an example embodiment of the described measuring system 110 within a surrounding environment 100.

A web service 101 may have an interface at a client system 102 and may provide access to the service of a service provider with computational processing provided over a network at a web server 103.

A measuring system 110 is described for measuring the robustness of a web server to denial of service attacks. The measuring system 110 may include a method selection component 111 for selecting a method of a web service for testing and measuring.

The measuring system 110 may include a request execution component 120 for executing a series of requests against the web service. The series of requests may include irregular requests, which may have a payload aimed at destabilizing a web server 101 providing the web service 104, as well as common requests that have regular parameters. The irregular requests may be generated using a list of attacks stored by a list of attacks component 121, and/or a request variant component 122 may be provided to vary the requests to create a request pattern. The variants may include the length of the message sent, changes to the structure of the request, mutations over parameters in the requests, etc.

The measuring system 110 may include a response time monitoring component 112 for measuring the response time of all the requests, including a common request which would be executed for the method.

A threshold setting component 113 may be provided for a user to set a threshold of the required response time for the selected method.

A performance test applying component 130 may be provided to create and apply a performance test for the request pattern with the worst response time measured for the requests executed by the request execution component 120. The performance test applying component 130 may include a virtual tester component 131 for basing the test on one or more virtual test injection platform machines.

In the virtual tester component 131, a virtual user may provide a single execution threat that may perform injection of calls against the web service 104 and one or more injection platforms may be provided as machines to execute the virtual users. When a given injection platform machine is saturated, and it cannot use more virtual users to increase the quantity of calls against the tested web service 104 because all the injection platform CPU is already consumed, then additional virtual users may be placed on a separate injection platform machine.

The performance test applying component 130 may include a workload ramp component 132 for controlling the workload rate. A test monitoring component 133 may monitor the test.

A reference request component 114 may be provided to execute at a low rate a common request against the web service to provide a reference of the health of the web service.

The performance test applying component 130 may perform the test until the threshold set by the threshold setting component 113 is reached. A metric determining component 115 may then determine a measurement of robustness of the method of the web service to the test.

Referring to FIG. 2, an exemplary system for implementing aspects of the invention includes a computing system 200, suitable for storing and/or executing program code, including at least one processor 201 coupled directly or indirectly to memory elements through a bus system 203. The memory elements may include local memory employed during actual execution of the program code, bulk storage, and cache memories that provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The computing system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 may be coupled to the computing system 200 either directly or through intervening I/O controllers. A user may enter commands and information into the computing system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Referring to FIG. 3, a flow diagram 300 shows an embodiment of the described measuring method at a client system, according to some embodiments.

A given web service method is selected for testing 301. The web service may be selected by the end user or selected based on a random selection using the WSDL (Web Services Description Language) file.

A series of requests may be executed, at blocks 302 and 303, against the given web service to identify a request pattern with a worst response time. Irregular requests may be executed 302, which may be generated with various different forms of payloads intended to destabilize a web service. Payloads may be designed to attack a server and requests may be based on known aggressive attacks or may be other forms of mutations of common requests.

If the requests are based on aggressive attacks, the following are examples of attacks that may be used.

The requests may be generated using a list of XDoS (XML denial of service attacks) and other CPU oriented attacks.

The requests may use common XML XDoS structure for entities attacks/External Entity Reference.

The requests may also use Buffer Overflow Attack by sending a huge XML payload or Unicode Attack.

Other common attacks may also be exercised, such as are used in security scanning tools like IBM® Rational Appscan® product, for example, SQL (Structured Query Language) injection attacks.

Attacks to structure payloads that could destabilize a web service may be dynamic and not limited. Depending on the security flaws discovered, new payloads may be generated by security tools and may be used in the described measuring method.

The aim of the requests is not to ascertain if an attack is successful but to check if it changes the response time of the web service being tested.

Irregular requests may include some variants added to the requests to generate the request pattern. For example variants may include the length side of the message sent, changes to the structure of the HttpRequest (MIME/DIME), mutations over parameters, etc., all under the banner of the extensible call generation library.

A common or regular request may also be executed, at block 303, for the method in order to ascertain an average real response time for a default call.

The response times for all the requests may be measured at block 304.

A threshold may be set at block 305 in terms of a response time for the selected method.

A performance test may be created at block 306 for the request pattern with the worst response time observed in block 304.

The request pattern with the worst response time may be the common request assuming that the infrastructure is "perfect." For example, a web service may already handle the following irregular requests efficiently, making the common request the slowest to perform: (1) Very large XML inputs: In this case, it will quickly answer an error, faster that a common answer based on its internal logic. (2) Wrong inputs: In this case, it will reject the inputs before engaging the internal logic; the response time will be better than the common answer.

The performance test may be based on several virtual injection machines and a ramp to control the workload.

In one embodiment, one machine may execute at a low rate a common request against the web service, and one or more additional machines may execute requests with the longest response time.

The reference common request machine may provide a reference of the health of the web service. The low rate means that the purpose is only to have a reference in the form of a kind of heartbeat of the response time of the web service, and the common request means that this is the expected input that is injected. This machine represents the common usage of the web service.

The machine(s) executing requests with the longest response times may execute those requests with the payload that generates the longest response time, and may increase the quantity of such calls using the workload ramp.

Another test may be generated that will monitor, at block 307, the given web service request.

The performance test may be executed, at block 308, until the threshold set in block 305 is reached.

The result may be determined, at block 309, as the quantity of requests per unit of time required to reach this threshold limit.

Assuming that the framework is "perfect," the resultant measure may correspond to a common performance benchmark. Real application tests have proven that the value related to this metric may be dramatically low requiring less requests per seconds to observe failures. As a result this method allows the user to scan and quantify specific weaknesses and vulnerability on the denial of service side.

Example 1

In this example, the web service may have a vulnerability to oversized parameters. It is assumed that a web service takes an integer as a parameter, and the input sent by the test is above the language length for the integer, for example: "11111111111111111111111111111111111111111111111111 111111111111111111111"

Then the input may lead to an exception on the web service side, and the exception execution on the server side might be more time consuming than the real web service application logic.

As a result, even if the developers/testers have validated that the web service is robust up to a workload rate (for example, 2000 calls per seconds), it is in fact possible to discover that using (only) 500 calls per second with this oversized parameter is enough to reduce the service availability.

Example 2

An example is given for a simple web service with a very fast response time and also a very good behavior in terms of capacity to absorb traffic (i.e., the quantity of requests executed per unit of time).

The measures will show how the web service is fast and well-defined to handle multiple requests at the same time. A threshold of 50 ms is defined as the maximum response time admissible for this service.

Some mutations are injected into the web service in some security attacks to locate a request pattern that creates a response time above the common response time for the service.

In this case, this request pattern is an injection of "extra large" values into the parameters, i.e., an expected value is an integer, and the method inserts a huge integer value beyond the language capacity.

The described measuring method then creates a test that will monitor the response time of the web service, and injects at the same time this request pattern to observe the service response time behavior.

The robustness of the service may be compared to the workload, and in this example, the response time remains under 35 ms even when there are more that 1000 requests executed per second against the service. Other tests show that the selected threshold of 50 ms is reached using around 2000 request per second. The described method may therefore score this with the value "2000."

The pattern request that has created the worst response time is then injected. In this example, two machines may inject this request pattern at a slow rate. Using two machines, a maximum rate of 15 calls per seconds will be made.

The result of this injection on the monitoring side is that the response time of the web service will reach the serviceability threshold, and the response time will keep being degraded. In this case, the method will score this behavior with the value "4." Only 4 calls per second using the request pattern are required to reach the 50 ms limit; when 15 calls per seconds are used, the response time is then around 120 ms.

Example 3

In the further example, a web service is tested, where the tested web service is also reliable in terms of workload that it can consume without a degradation of the server side. This web service is hosted on a single machine using Internet Information Services (IIS) and responds within 20-30 ms to the query. The described measuring method will test it using a request that is a common request to which a MIME attachment has been added, with a length of 50 Ko.

The threshold for the response time is set to 100 ms for this example.

The injector has created an overall workload of 2.5 requests per second against the system.

On the monitoring side, the beginning of the test is observed. By observing the result curves with accuracy, when the test has started with a rate of 3 calls per second, the response time has move from 30 ms to 1.6 seconds. Later, the server has continued to have its performances degraded until a response time of 10 seconds at the end of the test.

In terms of results, the test would be scored using a 3/16="0.18."

Mutations of Parameters:

Further details are now provided of possible mutations to the request pattern to provide irregular requests.

According to the XML Schema (XSD) types discovered for a given method into the WSDL file, an engine may compute mutations of the parameters.

A first category of mutations may be based on technologies that are well known to destabilize the web services infrastructures. A web service is supposed to be clean and vulnerabilities fixed to stabilize the web service code. The proposed measuring method may then provide mutations as a destabilization means, such that it will take time to provide an answer to the mutations from an external point of view. The mutations may lead to unknown code path due to exceptions or other issues.

A second category of mutations may be based on the transport, i.e., the Hypertext Transfer Protocol (HTTP), used to carry the message.

For the first category, the mutations may be the list of changes to the common web service calls that are produced by an application scanning tool, to which are added other patterns.

Patterns may be, for example: (1) Based on length of expected types. For instance, by sending an integer that is over the current 64 length of the integers, or a sending string with a 100 Ko length when a string is expected. (2) Based on wrong types. For instance, wrong types of values are inserted (e.g., a string when an integer is expected). (3) Based on insertion of a text node into the web service call. For instance, text nodes are nodes with a length of 100 Ko are inserted between the elements of the call.

Another example of mutation is to inject such payloads into the variables of a web service. For example:

. . .

<tns3:transferIntegerAmount>100%27+exec+master..xp_cmdshell+%27ver%27--+</tns3:transferIntegerAmount>

<tns3:debitStringAccount>20%27%3B+select+%40%40version%2C1%2C1%2C1--+</tns3:debitStringAccount>

</tns3:creditStringAccount>&hack;</tns3:transDetails>

<tns3:debitIStringAccount>%7Cvol<tns3:debitAccount>

. . .

The real payload may be larger, and in this example, only a few parameters of the web service are shown.

For the second category of transport (i.e., HTTP-related categories), the mutations may include the following.

Based on insertion of attachments into the web service call, such as:

Attachments (with a 1 Mo) length, based on Simple Object Access Protocol (SOAP) with Attachments (SwA), Message Transmission Optimization Mechanism (MTOM), or XML-binary Optimized Packaging (Xop) mechanism.

Based on http header changes, such as:

Length: Insertion of huge values into the headers for well known headers (user agent, content types, etc.);

i.e., SOAPAction: http://9999.9999.9999.9999:9999999/xxxxxxxxxxxxx . . . xxxxxx;

Wrong types: when types are expected (or structure), insertion of wrong values that will make the http header parser fail.;

i.e., parsing is done on Accept: text/html,application/xhtml+xml,application/xml;q=0.9,*/*;q=0.8.

This is related to the expected structure of this information; a server does not expect to have the underlined part, which can induce a parsing exception on the server side.

The invention can take the form of an entirely hardware embodiment, an entirely software embodiment, or an embodiment containing both hardware and software elements. In some embodiments, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for measuring robustness of web services, the method comprising:
    selecting a web service method of a web service for testing;
    generating a series of request patterns, said request patterns including a common request with standard payload and irregular requests each having a payload aimed at destabilizing the web service generated by a mutation of transport protocol based on insertion of attachments into a call for the web service;
    monitoring the response time of the web service method of the web service to the series of request patterns;
    determining the request pattern with the slowest response for use in a test, wherein determining the slowest response comprises:
        computing a minimum quantity of workload required to destabilize the web service based on a serviceability threshold, wherein the serviceability threshold is based on a slowest responding request;
    selecting, as a request pattern for the test, the request pattern with the slowest response;
    applying the test to the web service method, wherein the test uses the selected request pattern applied at an increasing frequency to the web service method;
    monitoring the response time of the request pattern by the web service method;
    determining, by a computer processor, the frequency of the applied request pattern when a threshold maximum time for response of the web service method to the request pattern is reached or when the method fails;
    determining a metric for the web service method based on the frequency of the applied request pattern required to reach the threshold.

2. The method of claim 1, wherein the mutation of parameters and the mutation transport protocols comprise one or more from the group of: the length of a value, the type of a value, insertion of a text node, the structure of a request, the mutation of parameters, injection of payloads into variables, the transport of a message, insertion of attachments, and transport protocol header changes.

3. The method of claim 1, further comprising:
generating the test to be applied to the web service method of the web service, wherein the generating comprises:
applying the selected request pattern with the slowest response time to the web service method using at least two injection machines; and
applying the selected request pattern at an increasing frequency.

4. The method of claim 1, further comprising applying a common request at a low frequency to provide a reference response time.

5. A system for measuring robustness of web services comprising:
web service method selection component configured to select a web service method of a web service for testing;
a generating component for generating a series of request patterns, said request patterns including a common request with standard payload and irregular requests each having a payload aimed at destabilizing the web service generated by a mutation of transport protocol based on insertion of attachments into a call for the web service;
a monitoring component for monitoring the response time of the web service method of the web service to the series of request patterns and determining the request pattern with the slowest response for use in a test, wherein determining the slowest response comprises:
computing a minimum quantity of workload required to destabilize the web service based on a serviceability threshold, wherein the serviceability threshold is based on a slowest responding request;
request execution component configured to select, as a request pattern for the test, the request pattern with the slowest response by the web service
a performance test applying component configured to apply the test to the web service method, wherein the test uses the selected request pattern applied at an increasing frequency to the web service method;
a test monitoring component configured to monitor the response time of the request pattern by the web service method;
metric determining component configured to determine, by a computer processor, the frequency of the applied request pattern when a threshold maximum time for response of the web service method to the request pattern is reached or when the web service method fails and to determine a metric for the web service method based on the frequency of the applied request pattern required to reach the threshold.

6. The system of claim 5, wherein the irregular requests are generated by a request variant component for generating mutations of parameters or transport protocols of requests; and wherein the mutations to parameters and transport protocols include any one or more from the group of: the length of a value, the type of a value, the structure of a request, the mutation of parameters, the transport of a message, insertion of attachments, transport protocol header changes.

7. The system of claim 5, further comprising:
request execution component configured to generate a series of request patterns;
a response time monitoring component configured to monitor the response time of the web service method of the web service to the series of request patterns;
a request pattern selection component configured to select the request pattern with the slowest response time for use in the test.

8. The system of claim 5, wherein the performance test applying component comprises:
a virtual tester component configured to apply the selected request pattern with the slowest response time to the web service method using at least two injection machines; and
a workload ramp component configured to apply the selected request pattern at an increasing frequency.

9. The system of claim 5, comprising a reference request component configured to apply a common request at a low frequency to provide a reference response time.

10. A computer program product for measuring robustness of web services, the computer program product comprising a non-transitory computer readable storage medium having program instructions embodied therewith, the program instructions executable by a processor to cause the processor to perform a method comprising:
selecting a web service method of a web service for testing;
generating a series of request patterns, said request patterns including a common request with standard payload and irregular requests each having a payload aimed at destabilizing the web service generated by a mutation of transport protocol based on insertion of attachments into a call for the web service;
monitoring the response time of the web service method of the web service to the series of request patterns;
determining the request pattern with the slowest response for use in a test, wherein determining the slowest response comprises:
computing a minimum quantity of workload required to destabilize the web service based on a serviceability threshold, wherein the serviceability threshold is based on a slowest responding request;
selecting, as a request pattern for the test, the request pattern with the slowest response by the web service method from a series of request patterns including irregular requests, each having a payload aimed at destabilizing the web service;
applying the test to the web service method, wherein the test uses the selected request pattern applied at an increasing frequency to the web service method;
monitoring the response time of the request pattern by the web service method;
determining the frequency of the applied request pattern when a threshold maximum time for response of the web service method to the request pattern is reached or when the web service method fails;
determining a metric for the web service method based on the frequency of the applied request pattern required to reach the threshold.

11. The computer program product of claim 10 wherein the mutation of parameters and the mutation transport protocols comprise one or more from the group of: the length of a value, the type of a value, insertion of a text node, the structure of a request, the mutation of parameters, injection of payloads into variables, the transport of a message, insertion of attachments, and transport protocol header changes.

12. The computer program product of claim 10, the method further comprising:
   generating a test to be applied to the web service method of the web service, wherein the generating comprises:
   applying the selected request pattern with the slowest response time to the web service method using at least two injection machines; and
   applying the selected request pattern at an increasing frequency.

\* \* \* \* \*